L. CONROY.
Breech-Loading Fire-Arms.
No. 145,154.  Patented Dec. 2, 1873.
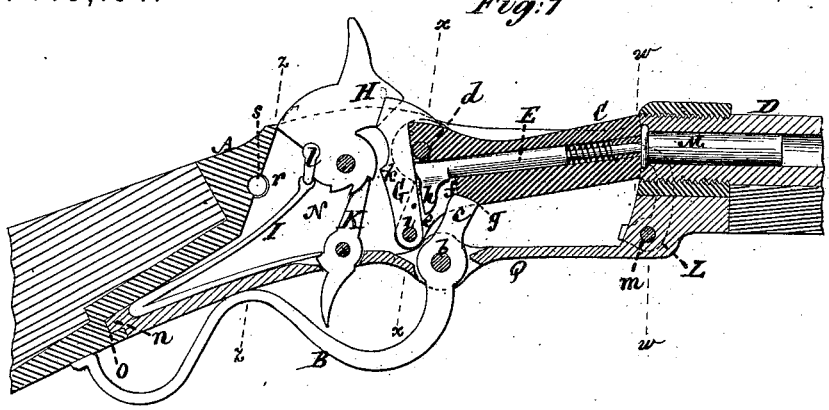
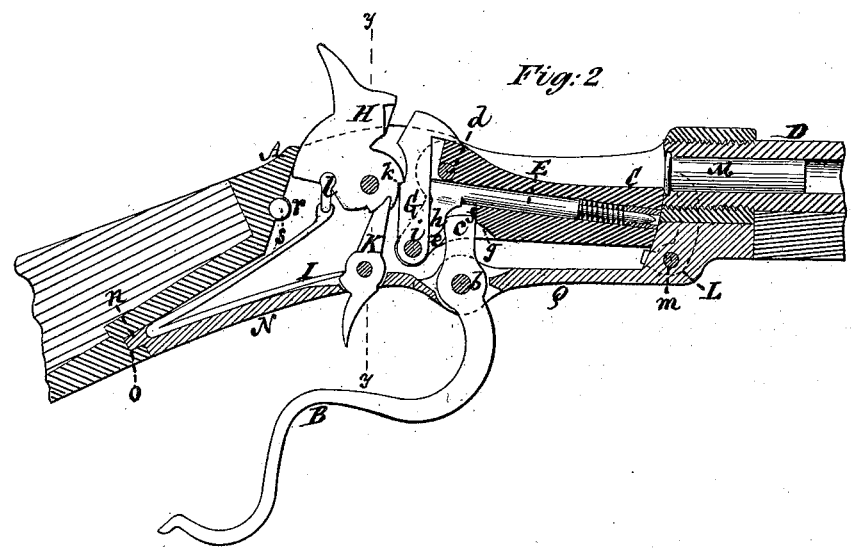
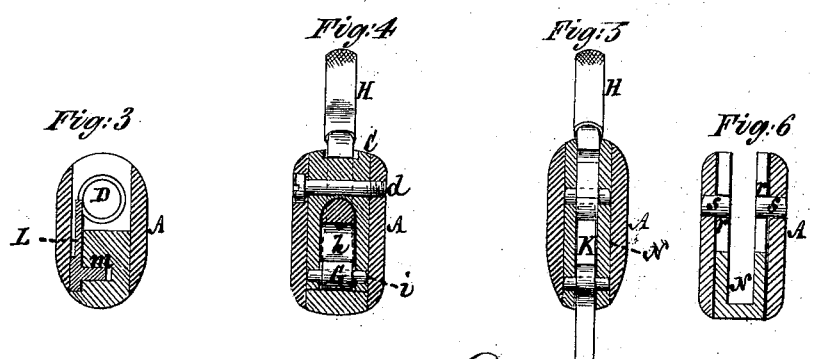
Witnesses:
Michael Ryan
Fred Haynes
Loughlin Conroy
by his attorney
Thom. H. Allen

UNITED STATES PATENT OFFICE.

LOUGHLIN CONROY, OF NEW YORK, N. Y.

IMPROVEMENT IN BREECH-LOADING FIRE-ARMS.

Specification forming part of Letters Patent No. 145,154, dated December 2, 1873; application filed April 9, 1873.

*To all whom it may concern:*

Be it known that I, LOUGHLIN CONROY, of the city, county, and State of New York, have invented certain new and useful Improvements in Breech-Loading Fire-Arms, of which the following is a specification:

The invention consists in certain novel combinations of parts, including a cocker-lever, pivoted below to the rear end of the breech-block, and interposed between the firing-pin and hammer, for movement in common with the breech-block as well as backward and forward; also, operating in concert with a hook on the firing-pin and upper arm of the lever-guard, and with the mainspring, to control the forward movement of the firing-pin; also, whereby provision is made by the elastic action of the mainspring for insertion of the cartridge and retention of the latter before the breech is closed; likewise other advantageous peculiarities of action are obtained.

In the accompanying drawing, which forms part of this specification, Figures 1 and 2 represent vertical longitudinal sections of the rear portion of a breech-loading fire-arm constructed in accordance with my invention, and with the operating parts in different positions; Fig. 3, a transverse section on the line $w$ $w$; Fig. 4, a like section on the line $x$ $x$; Fig. 5, a similar section on the line $y$ $y$; and Fig. 6, a further like section of the lock-frame or case and its receiver on the line $z$ $z$.

Similar letters of reference indicate corresponding parts throughout the several figures.

A represents the chamber or receiver containing the lock-case, breech-block, and working parts. B is the lever-guard, pivoted at $b$ and formed with an upward extension or projection, $c$, which operates within the receiver. C is the breech-block, having an up-and-down movement on or by a rear pivot, $d$, and curved at its front end, corresponding with the arc of the circle in which it works to form a close joint with the rear end of the cartridge-chamber or barrel D. This breech-block C is formed, on its under side at its rear end, with a recess, $e$, which, in its turn, is constructed to form on its front side a vertical or transverse shoulder, $f$, that connects below with a segmental or concave shoulder, $g$, on the under side of the breech-block. These shoulders $f$ and $g$ serve to control the action of the breech-block by the projection $c$ of the lever-guard. E is a firing-pin provided with a downwardly-projecting arm or hook, $h$, the use of which will be hereinafter explained. G is the "cocker"-lever, pivoted below, at $i$, to the breech-block, and interposed between the rear end of the latter or back end of the firing-pin E and hammer H. This cocker-lever has a twofold function, namely, by serving, in its forward movement, to transmit the blow from the hammer to the firing-pin in order to explode the cartridge, and serving, in its back movement, the purpose of placing the hammer at half-cock. Its lower portion also operates conjointly with the hook projection or arm $h$ of the firing-pin and with the upper extension, $c$, of the lever-guard when opening the breech. I is the mainspring of the gun, connected with the hammer by a saddle, $l$; and K is the trigger. L is the cartridge-shell extractor, working on a pivot, $m$, in a free or loose and detachable manner.

From the foregoing description it will be observed that the cocker-lever G occupies an approximately-vertical position, with its upper end above the top of the receiver A, and in line with the face or striking portion of the hammer H, while it is pivoted at its lower end, by its fulcrum-pin $i$, to the bottom rear end of the breech-block C, and moves with the latter. Said device G may, in view of its action, be termed a compound or double-acting lever of both the second and third orders, for, in its backward motion, which is to assist in half-cocking the hammer, the power is applied directly in rear of the firing-pin, above the hook or arm $h$, and the weight is at $o'$ on the hammer H, Fig. 1. This continues until the shoulder $k$ of the cocker-lever interferes with a corresponding shoulder formed on the hammer, when the weight is transferred to the shoulder $k$, where it remains until the half-cocking of the hammer is completed, which is done by an upward movement of the cocking-lever. Furthermore, it should be noticed that at the time the weight is transferred to the shoulder $k$ the power is also changed from the point directly back of the firing-pin down to the rear of the arm or hook $h$ of said pin, and that during this operation the fulcrum $i$ of the cocker-lever is, by the action of the breech-block, moved rearward and upward, which enables the shoulder $k$ to follow up and force back the hammer to half-cock. The object sought by this action is not to place the hammer at full cock automatically while being loaded, but to place it automatically at half-cock, which is safer. In the first part of its backward movement the cocking-lever presses against the face of the hammer to give the latter a slow motion, so that it will not be pressed back more than sufficient to complete the half-cock by the time the breech-block is lowered, so as to admit of reloading the arm. In the forward movement of the cocker-lever, supposing the gun to be loaded, with the hammer at full-cock and ready for firing, then, by releasing the trigger from the notch in the hammer, the mainspring, being free to act, throws forward the hammer, which strikes the cocker-lever at $o'$. The blow thus given is transmitted directly in rear of the firing-pin—that is, above the hook $h$—causing the firing-pin to be driven forward to explode the cartridge. When the cocker-lever is released or being released from the pressure of the hammer, by drawing back the latter to half-cock, the spring around the firing-pin, that operates to throw said pin back, causes the forward end of the pin to be withdrawn within and behind the face of the breech-block, and its rear end to press on the cocker-lever, forcing it back to and holding it in the proper position to receive the blow from the hammer when the gun is being discharged.

It may here be observed that the hook $h$ of the firing-pin, while not claimed as a novelty in itself, is a co-operative part of the combination in which the cocker-lever is an element, inasmuch as that, when the hammer is placed at half-cock, and before the breech begins to open, the effect of the pressure of the arm $c$ of the guard-lever on the hook $h$ is transmitted to the cocker-lever, and at a point above—that is, by the rear end of the firing-pin above the hook. This is done to remove the pressure or power farther from the fulcrum of the cocker-lever in order to gain leverage when pressing back the hammer to half-cock.

By further pulling down on the lever-guard the forward end of the breech-block is depressed below the bottom of the cartridge-chamber, and is caused to strike on the one arm or projection of the ejector L, close to the pivot of the latter, which makes the longer arm of the ejector press against the flange of the cartridge M with such force and rapidity as to throw the cartridge-shell clear out of its chamber. When the lever-guard B is relieved from pressure of the hand the forward end of the breech-block is raised by the action of the mainspring to a level, or nearly so, with the bottom of the cartridge-chamber, by which it will be seen, that to enter the cartridge in the chamber, it must first be pressed down slightly on the breech-block, and the latter be moved down with it against the resistance of the mainspring, so that after the cartridge is inserted in the barrel the breech-block immediately rises sufficiently above the flange of the cartridge to prevent it from falling out, even though the muzzle of the gun be elevated to an angle of ninety degrees, and the breech-block is unclosed. The breech-block is farther raised and closed by the action of the extension $c$ of the lever-guard on the straight shoulder $f$ of the breech-block, and is held raised by the subsequent passage of said extension under the curved shoulder $g$ of the breech-block.

The whole movement of the lever-guard to open the breech-block need be but slight.

What is here claimed, and desired to be secured by Letters Patent, is—

1. The cocker-lever G, pivoted to the lower rear projection of the downward and backward swinging breech-block, whereby, in addition to its having an independent movement to drive the firing-pin forward and to start the hammer, it is moved by the breech-block to continue the movement of the hammer to half-cock, as set forth.

2. The combination of the cocker-lever, the breech-block, and the lever-guard having the arm C, whereby the hammer is carried back by a duplex motion of the cocker-lever and the breech is opened, as specified.

3. The combination of the cocker-lever G, pivoted to the breech-block, as described, the hammer H, the firing-pin E, and the lever-guard B, for automatically placing the hammer at half-cock when the breech is being opened, as specified.

4. The arrangement, substantially as herein shown and described, of the cocker-lever G, the breech-block C, the hammer H, the mainspring I, and the trigger K, whereby, when the breech-block is depressed to its fullest extent, and pressure removed from the guard-lever, the mainspring lifts the upper surface of the forward end of the breech-block, so as to retain the cartridge after insertion, before the breech-block is closed.

L. CONROY.

Witnesses:
HENRY T. BROWN,
MICHAEL RYAN.